(12) United States Patent
Lung et al.

(10) Patent No.: US 8,321,432 B2
(45) Date of Patent: *Nov. 27, 2012

(54) SYSTEM AND METHOD FOR FILTERING ELECTRONIC MESSAGES USING BUSINESS HEURISTICS

(75) Inventors: Peter K. Lung, San Francisco, CA (US); Scott M. Petry, Palo Alto, CA (US); Jason H. Titus, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/634,436

(22) Filed: Dec. 9, 2009

(65) Prior Publication Data

US 2010/0088765 A1    Apr. 8, 2010

Related U.S. Application Data

(62) Division of application No. 10/832,407, filed on Apr. 26, 2004, now Pat. No. 7,647,321.

(51) Int. Cl.
*G06F 17/30* (2006.01)

(52) U.S. Cl. ..................................... 707/754; 707/952

(58) Field of Classification Search .................. 707/754, 707/952, 999.01, 999.107, E17.059; 726/27–30; 709/203, 219

See application file for complete search history.

(56) References Cited

U.S. PATENT DOCUMENTS

| | | | |
|---|---|---|---|
| 4,837,798 A | 6/1989 | Cohen et al. | |
| 5,619,648 A | 4/1997 | Canale et al. | |
| 5,627,764 A | 5/1997 | Schutzman et al. | |
| 5,634,005 A | 5/1997 | Matsuo | |
| 5,742,668 A | 4/1998 | Pepe et al. | |
| 5,771,355 A | 6/1998 | Kuzma et al. | |
| 5,796,948 A | 8/1998 | Cohen | |
| 5,832,208 A | 11/1998 | Chen et al. | |
| 5,844,969 A | 12/1998 | Goldman et al. | |
| 5,889,943 A | 3/1999 | Ji et al. | |
| 5,905,777 A | 5/1999 | Foladare et al. | |

(Continued)

FOREIGN PATENT DOCUMENTS

WO    WO 96/35994    11/1996

(Continued)

OTHER PUBLICATIONS

Supplementary European Search Report, EP 03711094.7 dated Sep. 6, 2005.

(Continued)

*Primary Examiner* — Leslie Wong
(74) *Attorney, Agent, or Firm* — Baker & McKenzie LLP

(57) ABSTRACT

Disclosed are systems and methods for use in filtering electronic messages using business heuristics. In one aspect, a method includes determining whether the electronic message is associated with a desirable business, and adjusting the likelihood of delivering the electronic message to an intended recipient of the message if the electronic message is determined to be associated with the desirable business. In a more specific embodiment, the method further includes assigning a spam-score to the electronic message based on a likelihood that the electronic message is not unwanted by the intended recipient, blocking delivery of the electronic message to the intended recipient when the spam-score does not cross an overall threshold, and delivering the electronic message to the intended recipient based on the adjusted likelihood when the electronic message is determined to be associated with the desirable business.

20 Claims, 4 Drawing Sheets

U.S. PATENT DOCUMENTS

| | | | |
|---|---|---|---|
| 5,937,161 | A | 8/1999 | Mulligan et al. |
| 5,937,162 | A | 8/1999 | Funk et al. |
| 5,968,117 | A | 10/1999 | Schuetze |
| 5,987,611 | A | 11/1999 | Freund |
| 5,999,932 | A | 12/1999 | Paul |
| 6,014,429 | A | 1/2000 | LaPorta et al. |
| 6,023,723 | A | 2/2000 | McCormack et al. |
| 6,052,709 | A | 4/2000 | Paul |
| 6,061,718 | A | 5/2000 | Nelson |
| 6,073,165 | A | 6/2000 | Narasimhyan et al. |
| 6,075,863 | A | 6/2000 | Krishnan et al. |
| 6,092,194 | A | 7/2000 | Touboul |
| 6,112,227 | A | 8/2000 | Heiner et al. |
| 6,118,856 | A | 9/2000 | Paarsmarkt et al. |
| 6,138,146 | A | 10/2000 | Moon et al. |
| 6,146,026 | A | 11/2000 | Ushiku |
| 6,147,987 | A | 11/2000 | Chau et al. |
| 6,178,331 | B1 | 1/2001 | Holmes et al. |
| 6,249,805 | B1 | 6/2001 | Fleming, III |
| 6,249,807 | B1 | 6/2001 | Shaw et al. |
| 6,263,202 | B1 | 7/2001 | Kato et al. |
| 6,266,664 | B1 | 7/2001 | Russell-Falla et al. |
| 6,301,245 | B1 | 10/2001 | Luzeski et al. |
| 6,317,751 | B1 | 11/2001 | Yeger et al. |
| 6,321,267 | B1 | 11/2001 | Donaldson |
| 6,334,140 | B1 | 12/2001 | Kawamata |
| 6,335,966 | B1 | 1/2002 | Toyoda |
| 6,389,276 | B1 | 5/2002 | Brilla et al. |
| 6,404,762 | B1 | 6/2002 | Luzeski et al. |
| 6,411,684 | B1 | 6/2002 | Cohn et al. |
| 6,434,601 | B1 | 8/2002 | Rollins |
| 6,438,215 | B1 | 8/2002 | Skladman et al. |
| 6,442,589 | B1 | 8/2002 | Takahashi et al. |
| 6,453,327 | B1 | 9/2002 | Nielsen |
| 6,487,586 | B2 | 11/2002 | Ogilvie et al. |
| 6,513,045 | B1 | 1/2003 | Casey et al. |
| 6,574,658 | B1 | 6/2003 | Gabber et al. |
| 6,609,196 | B1 | 8/2003 | Dickinson, III et al. |
| 6,615,241 | B1 | 9/2003 | Miller et al. |
| 6,615,258 | B1 | 9/2003 | Barry et al. |
| 6,650,890 | B1 | 11/2003 | Irlam et al. |
| 6,654,787 | B1 | 11/2003 | Aronson et al. |
| 6,691,156 | B1 | 2/2004 | Drummond et al. |
| 6,711,618 | B1 | 3/2004 | Danner et al. |
| 6,779,021 | B1 | 8/2004 | Bates et al. |
| 6,868,498 | B1 | 3/2005 | Katsikas |
| 7,257,564 | B2 | 8/2007 | Loughmiller et al. |
| 7,272,378 | B2 | 9/2007 | Petry et al. |
| 7,277,695 | B2 | 10/2007 | Petry et al. |
| 2001/0032095 | A1 | 10/2001 | Balbach |
| 2002/0059454 | A1 | 5/2002 | Barrett et al. |
| 2002/0199095 | A1 | 12/2002 | Bandini et al. |
| 2003/0101181 | A1 | 5/2003 | Al-Kofahi et al. |
| 2004/0117648 | A1 | 6/2004 | Kissel |
| 2004/0128355 | A1 | 7/2004 | Chao et al. |
| 2004/0267893 | A1 | 12/2004 | Lin |
| 2005/0182959 | A1 | 8/2005 | Petry et al. |
| 2005/0210116 | A1 | 9/2005 | Samson |
| 2006/0265459 | A1 | 11/2006 | Petry et al. |

FOREIGN PATENT DOCUMENTS

| | | |
|---|---|---|
| WO | WO 97/12321 | 4/1997 |
| WO | WO 97/27546 | 7/1997 |
| WO | WO 98/37680 A2 | 8/1998 |
| WO | WO 99/06929 | 2/1999 |
| WO | WO 99/65256 | 12/1999 |
| WO | WO 99/67731 | 12/1999 |
| WO | WO 00/42747 | 7/2000 |
| WO | WO 00/49776 | 8/2000 |
| WO | WO 01/46867 | 6/2001 |
| WO | WO 02/08938 | 1/2002 |

OTHER PUBLICATIONS

European Examination Report, EP 01977347.2 dated Aug. 26, 2005.
"Automated Spam Detection" R. Lonn, Feb. 16, 1999.
http://web.archive.org/web/20000815053401/www.brightmail.com/corporate/overview/, dated Aug. 15, 2000.
http://web.archive.org/web/19990128140052/http://www.chooseyourmail.com/, dated Jan. 28, 1999.
http://web.archive.org/web/20000815064559/www.commtouch.com/solutions/index.shtml, dated Aug. 15, 2000.
http://web.archive.org/web/20001205151400/mailcircuit.com/route.htm, dated Dec. 5, 2000.
http://web.archive.org/web/20000824040241/www.messagelabs.com/about/Overview/Overview.htm, dated Aug. 24, 2000.
http://web.archive.org/web/20000816134259/www.antivirus.com/products/email-groupware.htm, dated Aug. 16, 2000.
International Search Report, Form PCT/ISA/210 dated Apr. 14, 2004, PCT Application No. PCT/US03/04757.
EMC News Release, "EMC Launches Centera, Ushers in New Era of Content-Addresses Storage," New York, Apr. 29, 2002. www.emc.com/news/press_releases/view.jsp?id=1254.
CVS.SOURCEFORGE.NET, "Spam Filtering ESMTP Demon", copyright notice dated 2000, publ. at http://cvs.sourceforge.net/viewcvs.py/clocc/clocc/src/donc/smt-p.lisp?rev=1.4.
Bounce Spam Mail, from Albert Yale Software, dated 1997-2000.
CSM Internet Mail Scanner, from CSM-USA, Inc., dated 1999.
CyberSitter AntiSpam, from CyberSitter.com, distributed by Solid Oak Software, circa 1999-2000.
DL MailFilter, from DeadLetter and Leem Han Cheong, dated Nov. 1999.
E-Mail Chompaer, from Lorenzo Pasqualis, dated 1996-97.
E-Mail Remover, from Victor Javier, Virtual Network, Inc., Singapore, dated Mar.-Jul. 1998, and 1999.
FlameThrower, from Eagle Research, Inc., dated 2000.
Interceptor, from Grok Development Ltd., dated 1999-2000.
JOC E-Mail Checker, from JOCSoft and Jose Olice Civit, dated 2000.
Quickhead-E, from Danere Software Innovations, dated Mar. 2000.
Spam Attack Pro, circa 1996-97, from softwiz.com.
Spam Buster, from Contact Plus Corp., dated 2000.
SpamEater, from High Mountain Software, dated 1997-2000.
BrightMail, from BrightMail, Inc., dated 1997-2000.
Praetor, from Computer Mail Services, Inc., circa 1998-1999.
"MsgTo.com Stops Spam Email", web page circa Nov. 19, 1999, from www.applesforhealth.com.
"The Species Filter", by Rafe Needleman, ed., dated Aug. 6, 1999, from www.RedHerring.com.
Official Sep. 1999 AUP (Auto Update Program) v5.0 Build 447, Product Updated Release, winserver.com.
Supplementary European Search Report, EP 01977347 dated Apr. 7, 2005.
PCT/US05/10276, International Search Report and Written Opinion dated Nov. 14, 2006.

FIG. 4

| | | Lenient | | | | Aggressive | |
|---|---|---|---|---|---|---|---|
| | Bulk E-Mail | ○ | ○ | ⊙ | ○ | ○ | |

| | | OFF | | | | | |
|---|---|---|---|---|---|---|---|
| XXX | Sexually Explicit | ○ | ○ | ○ | ⊙ | ○ | Adjust overall protection against sexually-oriented messages |
| $ | Get Rich Quick | ○ | ○ | ⊙ | ○ | ○ | Adjust overall protection against money-making offers |
| | Special Offers | ○ | ○ | ○ | ⊙ | ○ | Adjust overall protection against too-good-to-be-true offers |
| | Racially Insensitive | ○ | ○ | ○ | ○ | ⊙ | Adjust overall protection against hate-oriented topics |

[ Save Changes ] [ Cancel ]

FIG. 6

| | No Extra Importance | | | | Extra Importance | |
|---|---|---|---|---|---|---|
| Legal | ○ | ○ | ⊙ | ○ | ○ | Adjust overall protection to allow matters related to the legal industry |
| Financial | ○ | ○ | ○ | ⊙ | ○ | Adjust overall protection to allow matters related to the financial industry |

[ Save Changes ] [ Cancel ]

SYSTEM AND METHOD FOR FILTERING ELECTRONIC MESSAGES USING BUSINESS HEURISTICS

CROSS-REFERENCE TO RELATED APPLICATION

The present application is a Divisional Application of, and thus claims priority to, application Ser. No. 10/832,407, filed Apr. 26, 2004 now U.S. Pat. No. 7,647,321, the entire contents which are incorporated herein in its entirety, for all purposes.

TECHNICAL FIELD

Disclosed embodiments herein relate generally to the filtering of electronic messages (e-mail), and more particularly to systems and method for filtering electronic messages using business heuristics.

BACKGROUND

E-mail management is commonly handled by ISPs that have user/subscribers, or by company servers located at facilities where the e-mail users are employed. A part of e-mail management comprises filtering for spam or virus control, but when such e-mail management is performed at the ISP or at the company server location, valuable communication bandwidth and computing resources are expended on routing, analyzing, and other handling of spurious e-mail traffic. Present e-mail management systems are further characterized by a lack of real-time monitoring, feedback, and updating of rules regarding e-mail traffic or SMTP connection situations. Thus, management and monitoring of e-mail traffic situations is commonly handled through human intervention.

Even if these concerns are addressed in modern e-mail management systems, the techniques typically employed to filter out unwanted spam messages is relatively ineffective as a whole. Specifically, as conventional techniques developed, so too did techniques employed by the senders of spam messages to circumvent many of even the most aggressive approaches. Making matters worse, even in situations where filtering techniques are successful in preventing unwanted messages from reaching their intended recipients, many otherwise valid messages are also blocked from delivery. Among the problems plaguing conventional systems employed for blocking unwanted messages is the phenomenon "spoofing" e-mail addresses to trick filtering system into believing the message is being sent by a valid sender. As a result, even filtering systems that employ "approved senders" configured by users are still ineffective against such attacks. Moreover, as mentioned above, if conventional systems are upgraded with available tools to assist in preventing such attacks, the end result typically is that many valid messages are prevented from reaching the user, which results in losses in both time and costs.

BRIEF SUMMARY

Disclosed are systems and methods for use in filtering electronic messages using business heuristics. As used herein, the term "business" is not intended to be limited to a business organization or to any one capitalist endeavor, but rather includes any and all organizations and any and all endeavors including professional, industrial, service-oriented, charitable, self-serving, etc. In one aspect, a method includes determining whether the electronic message is associated with a desirable business, and adjusting the likelihood of delivering the electronic message to an intended recipient of the message if the electronic message is determined to be associated with the desirable business. In a more specific embodiment, the method further includes assigning a spam-score to the electronic message based on a likelihood that the electronic message is not unwanted by the intended recipient, blocking delivery of the electronic message to the intended recipient when the spam-score does not cross an overall threshold, and delivering the electronic message to the intended recipient based on the adjusted likelihood when the electronic message is determined to be associated with the desirable business.

In another aspect, a related system for filtering an electronic message using business heuristics is also disclosed. In one embodiment, the system includes a message handler configured to receive the electronic message, and a heuristics module associated with the message handler and configured to determine whether the electronic message is associated with a desirable business. In such an embodiment, the message handler is further configured to adjust the likelihood that the electronic message will be delivered to the intended recipient if the electronic message is determined to be associated with the desirable business. In a more specific embodiment, such a system also includes a software module associated with the message handler and configured to assign a spam-score to the electronic message based on a likelihood that the electronic message is not unwanted by an intended recipient of the electronic message, where the message handler is further configured to block delivery of the electronic message to the intended recipient when the spam-score does not cross an overall threshold.

BRIEF DESCRIPTION OF THE DRAWINGS

Reference is now made to the following detailed description of the preferred embodiments, taken in conjunction with the accompanying drawings. It is emphasized that various features may not be drawn to scale. In fact, the dimensions of various features may be arbitrarily increased or reduced for clarity of discussion. Reference is now made to the following descriptions taken in conjunction with the accompanying drawings, in which:

FIG. 4 illustrates one embodiment of a screen shot for setting multiple thresholds for filtering unwanted e-mail messages;

FIG. 6 illustrates one embodiment of a screen shot for setting business-specific thresholds, in addition to the base thresholds described above, in accordance with the disclosed principles;

DETAILED DESCRIPTION OF PREFERRED EMBODIMENTS

Figure 1:
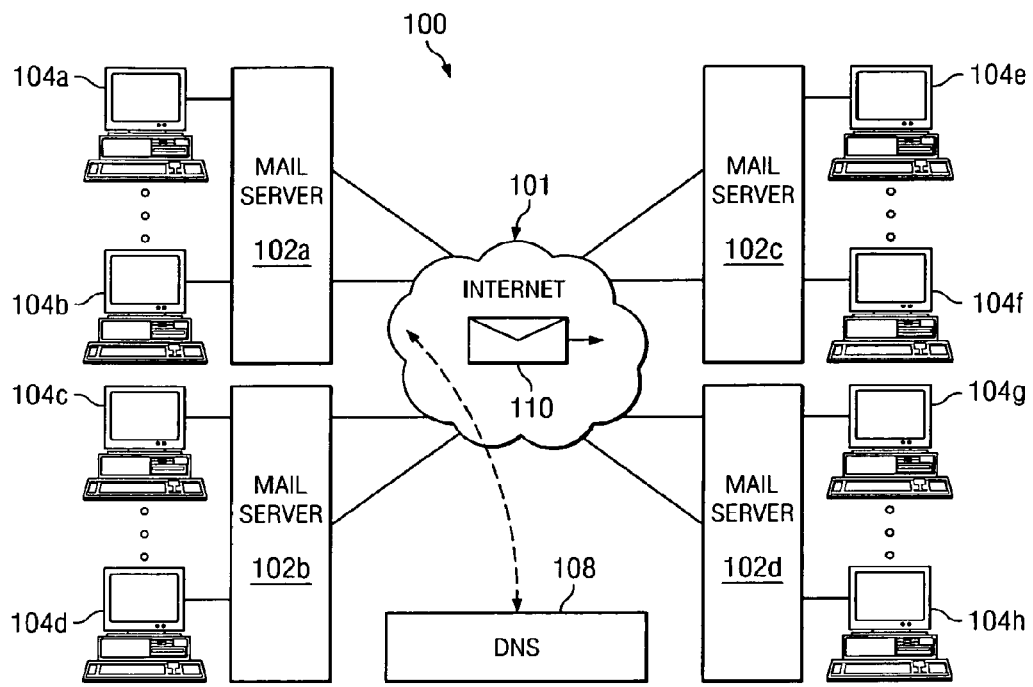
FIG. 1 illustrates one embodiment of a prior art system for the delivery of e-mail messages through the Internet or other computer network.

Referring initially to FIG. 1, illustrated is one embodiment of a prior art system 100 for the delivery of e-mail messages through the Internet 101 or other computer network. Sending mail servers 102a, 102b (having associated source Internet protocol (IP) addresses) and receiving mail servers 102c, 102d (having associated destination IP addresses), or other message gateways, allow electronic messages, such as electronic mails (or "e-mails") to be delivered to and from sending client machines 104a-104d to receiving client machines 104e-104h, or other devices such as cell phones, pagers, and/or hand-held computers. In accordance with conventional systems, the transmission direction of the e-mails may also be reversed, where the sending machines and servers become the receiving machines and servers and vice versa.

E-mail messages are typically composed by an application running on a client machine 104. When composition of the message is completed, the user uploads the completed message to a mail server 102. The mail server 102 in one embodiment is owned by an Internet Service Provider (ISP) or by a private corporation for whom the user works. The user client machine 104 connects to the mail server 102 via dial-up, digital subscriber loop (DSL), cable Internet, or by other appropriate means. One standard for e-mail formats is described by RFC 822 obsoleted by RFC2822, which are a standard and a proposed standard, respectively, promulgated by Internet Engineering Task Force ("IETF"). The protocol by which e-mail messages are transmitted from sending mail server 102 to receiving mail server 102 are described by RFC821, obsoleted by RFC 2821, which are also a standard and a proposed standard, respectively, of the IETF. These standards can be found at <www.ietf.org>. The present disclosure hereby incorporates by reference the subject matter of the RFC 821 and RFC 822 standards and the RFC 2821 and RFC2822 proposed standards. If the proposed standards are updated from the versions published in April 2001, it is the subject matter of the April 2001 versions of these proposed standards that is hereby incorporated by reference. The RFC 821 and RFC 2821 documents describe a Simple Mail Transport Protocol ("SMTP"), which is the protocol by which e-mail messages have typically been transported over the Internet.

SMTP servers and SMTP clients (SMTP clients are network computers, not to be confused with the client machines 104) provide a mail transport service, and therefore act as Mail Transfer Agents ("MTAs"). Mail User Agents ("MUAs" or "UAs") are normally thought of as the sources and targets of mail. At the source, an MUA might be the source mail server 102a, 102b that collects mail to be transmitted from a user and hands it off to an MTA within the network 101. The final ("delivery") MTA would be thought of as handing the mail off to an MUA, which might be the destination mail server 102c, 102d that holds a user's mail in the user's inbox.

The SMTP mail transport protocol uses domain names to route messages from a sender to a receiver of e-mail. A distributed database of TCP/IP addresses corresponding to particular domain names is maintained across the Internet 101 in Domain Name Servers ("DNSs") 108. Thus, to route an e-mail to its destination, the source mail servers 102a, 102b would generally take the address specified by the sending user and inquire of a DNS server 108 the IP address to be assigned to the particular addressed domain name. As used in this specification, an "address" is a character string that identifies a user to whom mail will be sent, a user or source that is sending mail, or a location into which mail will be deposited. The term "mailbox" refers to that depository. The two terms are typically used interchangeably unless the distinction between the location in which mail is placed (the mailbox) and a reference to it (the address) is important. An address normally consists of user and domain specifications; however, addresses may have different forms depending on usage and type of address. The standard mailbox naming convention is defined to be "local-part@domain"; contemporary usage permits a much broader set of applications than simple "user names". The local part of the address is typically interpreted and assigned semantics only by the host specified in the domain part of the address. In contrast, the standard IP address is typically a specific string of numbers identifying a source or destination server.

Once the source mail server 102a, 102b lexically identifies a domain to which email will be delivered for processing, a DNS lookup, through a DNS server 108, is performed to resolve the domain name. The email 110 is then sent from the source mail server 102a, 102b via the Internet 101 to the identified domain.

Figure 2:
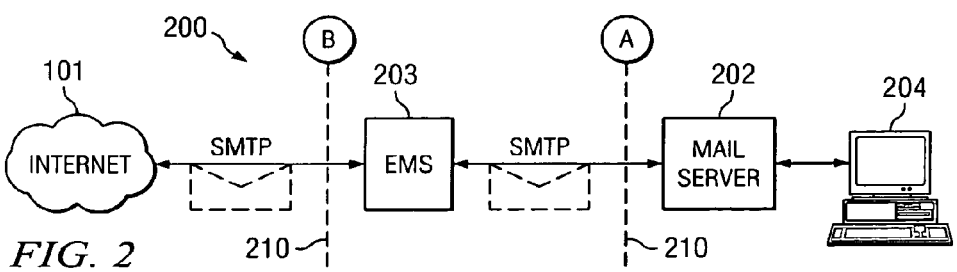
FIG. 2 illustrates a block diagram of an embodiment in which an active Electronic Message Management System is provided between the Internet and receiving mail server.

Turning now to FIG. 2, illustrated is a block diagram 200 of an embodiment in which an active Electronic Message (e.g., E-Mail) Management System (EMS) 203 is provided between Internet 101 and receiving mail server 202. The EMS 203 of the present invention is "active" and automated since it is constantly managing attempted transmissions of electronic messages without the need for human intervention at various steps of the management process. In this sense, an EMS 203 according to the principles disclosed herein is automated, and configured to manage message delivery in real-time.

The EMS 203 is able to interpret conditions, analyze patterns, and manage the delivery of data to the receiving server 202 by performing processing steps as each of the SMTP connection between the sender and recipient are processed. Traditional e-mail servers will typically accept the message data and write the message to disk prior to performing analysis. The EMS 203 is able to perform management steps at each stage of the SMTP transaction in order to minimize impact on the destination server 202, while providing security and management. So that mail intended for the mail server 202, and thus the receiving client's terminal 204, is routed through the EMS 203, the numerical IP address in the DNS 108 that is associated with the domain name of the targeted mail server 202 is updated to reflect the numerical address of the EMS 203. For example, suppose the domain name of the mail server 202 is "anywhere.com" and the numerical IP addresses for the mail server 202 and EMS 203 were "1234.5678.9876.5432" and "9876.5432.1234.5768," respectively. Then the records in the distributed DNS database 108 for <anywhere.com> would be updated to reflect the EMS's numerical address "9876.5432.1234.5768," rather than "1234.5678.9876.5432."

Although this figure shows the EMS 203 as being physically adjacent to the mail server 202, such placement is only for illustration purposes. The EMS 203 can be located anywhere on the Internet 101. It can also be located either outside or within the mail server's 202 associated firewall 210, as shown by the optional positioning of the 20 firewall 210 at position "A" (outside the firewall) or at position "B" (inside the firewall). Alternatively, the EMS 203 could possibly run on the same physical machine as the mail server 202.

Figure 3:
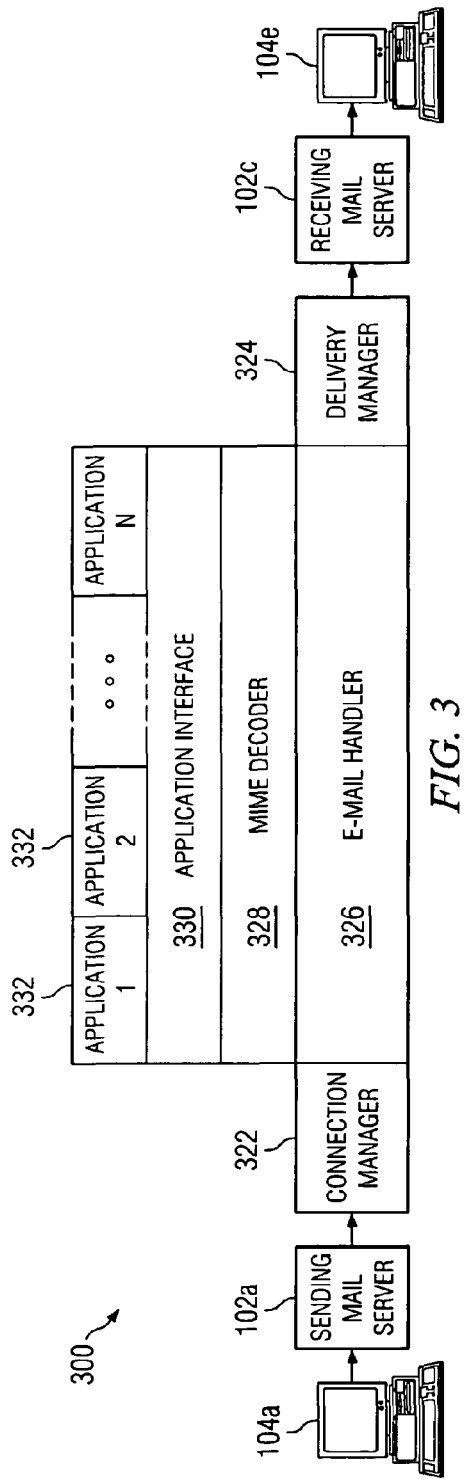
FIG. 3 illustrates a more detailed diagram including a block diagram of the EMS shown in FIG. 2.

Looking now at FIG. 3, illustrated is a more detailed diagram including a block diagram 300 of the EMS 203 shown in FIG. 2. An administrative console (not illustrated) may be located on the same particular server machine as the actual EMS system 203 for providing an administrative access tool to assist in configuring how the EMS 203 processes incoming electronic messages. The connections between the EMS 203 and the mail servers 102a, 102c may be made through Internet or SMTP connections. As previously mentioned, the EMS 203 could exist inside or outside a particular firewall with or without one of the mail servers 102a, 102c.

Generally, the system shown in FIG. 3 handles e-mail from a "sending" mail server 102a. The designation of one mail server as a "sender" and the other as a "receiver" is arbitrary. Practically speaking, both mail servers 102a, 102c will generally act as both sender and receiver of electronic messages from and to the mail servers' 102a, 102c sending and receiving clients 104a, 104e. In the embodiment shown, at least one of the mail servers' 102a, 102c domain names will be associated with the EMS 203 in the DNS distributed database and its servers 108. In embodiments employing the administrative console, the console receives information from the EMS 203 regarding the types of electronic messages which are coming in for particular users or groups of users, such as information regarding the suspected viruses and spam e-mails, directory harvest attacks, or unwanted content or delivery attempts that have been sent to the user or users.

The EMS 203 is shown in FIG. 3 as including several interconnected message handling software modules for processing electronic messages. For a more detailed discussion, reference is made to co-pending patent application Ser. No. 10/370,118, filed Feb. 19, 2003, and entitled "E-Mail Management Services", which is commonly assigned with the present disclosure and incorporated herein by reference in its entirety for all purposes. The layout of these various software modules is not indicative of any particular physical structure in the machine running these software modules. One module illustrated is a connection management module, or simply a connection manager 322. The connection manager 322 is responsible for setting up and monitoring incoming SMTP connections from UAs/mail servers 102a (or Mail Transfer Agents). The connection manager 322 is the entry point to the EMS 203, and it monitors the incoming SMTP connection attempts and e-mail messages. Specialized processes found, for example, in software daemons, interact with data collected from the incoming messages and/or connection attempts to recognize patterns of messages within the traffic of messages that can be acted upon. More specifically, the connection manager 322, an e-mail handler 326, plug-in applications 332, and a delivery management module (or simply a delivery manager 324), are all employed to process incoming electronic messages.

The e-mail handler 326 takes an incoming e-mail message and can "scrape" or extract information from the message as it is going by, i.e., without imposing a delay on the delivery of the message. The e-mail handler 326 is also able to conditionally deliver messages via the delivery manager 324, either on its own accord or according to instructions. The e-mail handler 326 is conceptually connected to a Multipurpose Internet Mail Extensions (MIME) decoder 328 and to an application interface 330. The application interface 330 provides an interface between the e-mail handler 326 and the plug-in applications 332 mentioned above. Following a configuration established by rules stored, for example, in an associated database, patterns in the data may be determined so that message processing information, typically in the form of disposition instructions, may be created. If one of the applications 332, such as a spam detection application, returns a value for a message (i.e., a "spam score") based on the likelihood that the message is not spam, the e-mail handler 326 can configure the delivery of the message to route it to a quarantine website.

The decisions on which electronic messages are passed, diverted, deferred, etc. are made in part based on the metadata generated from the universe of incoming messages, and based on the way the EMS 203 has been configured and the applications 332 selected for processing the messages. Depending on the condition preventing transmission of the message to the intended recipient, even if a connection by the connection manager 322 is accepted, the delivery manager 324 may be instructed to dispose of the message appropriately.

Turning briefly now to FIG. 4, illustrated is one embodiment of a screen shot 400 for setting multiple thresholds for filtering unwanted e-mail message. More specifically, the screen shot 400 illustrates the opportunity to adjust the settings on an overall threshold for incoming e-mails: "Bulk E-mail". In addition, the screen 400 allows for adjusting the settings in base thresholds based on specific categories: "Sexually Explicit", "Get Rich Quick", "Special Offers", and "Racially Insensitive". Once a user has made his desired selections and adjustments, the changes may be saved by clicking the "Save Changes" button on the screen. In addition, if the adjustments are not to be kept, the user may simply cancel the changes by clicking the illustrated "Cancel" button.

The overall threshold, "Bulk E-mail", is employed for establishing an overall tolerance for filtering incoming e-mail messages. Specifically, e-mail filtering processes typically assign a spam score to all incoming e-mails that indicates the likelihood that the e-mail is not spam (i.e., that the e-mail is not necessarily unwanted by the intended recipient). Of course, the process may alternatively be configured where the spam score is based on the likelihood that the e-mail is spam. The basis for assigning such spam scores differs for each specific filtering process based on the criteria each process is configured to examine. For example, a spam score may be affected by a source IP address of the e-mail (e.g., a known "spammer") or if it is determined to be part of a mass e-mailing attempt, such as a directory harvest attack. As a result, if the spam score assigned to an incoming e-mail does not exceed the preset overall tolerance setting, then the e-mail will be filtered and not reach the intended recipient. As illustrated, the level of tolerance for such filtering may be adjusted using on-screen selection within a range from "Lenient" to "Aggressive". As may be expected, as this overall setting is increased towards the "Aggressive" side, more incoming e-mail messages are likely to be filtered out. However, as the number of filtered messages increases with the change in tolerance, so too does the chance for "false positives" in the screening process, where valid and desirable e-mail messages are improperly identified as spam and filtered. As a result, each user of the filtering process may adjust his individual overall threshold.

Also capable of being adjusted are the four base thresholds identified above. However, where the "Bulk E-mail" threshold is typically applied against incoming messages based on source or destination IP addresses, the remaining four base thresholds typically employ content-based filtering processes. Such content-based filtering processes may be embodied in the application modules 332 discussed with reference to FIG. 3. As before, users may individually adjust the tolerance in each of these four base thresholds depending on their personal tolerance for receiving unwanted e-mail that should have been filtered, or, alternatively, the improper filtering of e-mail that should have been allowed to pass through to the intended recipient's inbox. Furthermore, these base thresholds also provide the option of shutting off each particular filter threshold, as illustrated in the screen shot 400.

Figure 5:
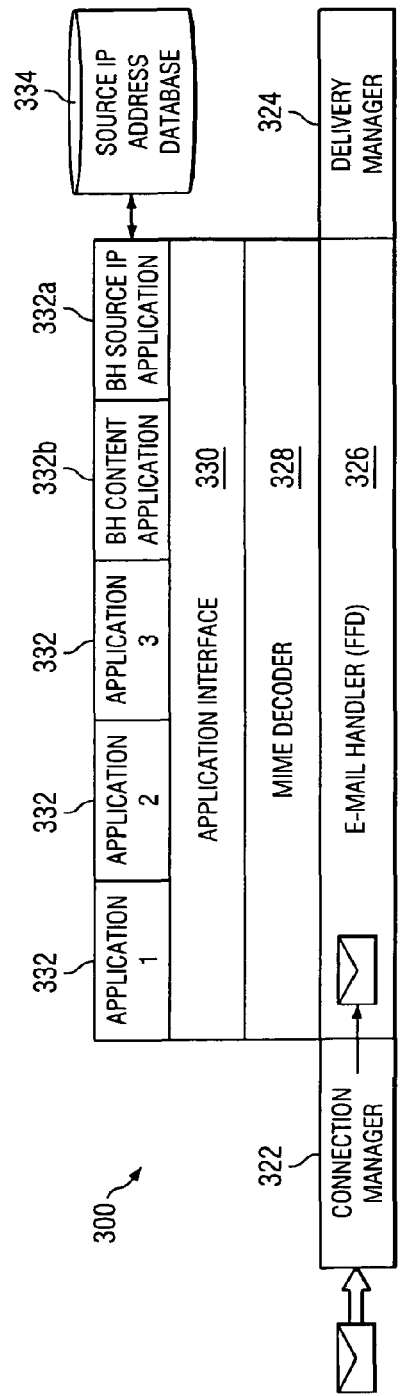
FIG. 5 illustrates a more detailed view of the block diagram of the EMS discussed with reference to FIG. 3.

Referring now to FIG. 5, illustrated is a more detailed view of the block diagram 300 of the EMS discussed with reference to FIG. 3. As before, the EMS still includes the connection manager 322, which is responsible for setting up and monitoring incoming SMTP connections from mail servers and monitoring incoming SMTP connection attempts and e-mail messages. The EMS still also includes the e-mail handler 326, the MIME decoder, the delivery manager 324, and the plug-in applications 332, which communicate with the e-mail handler 326 via the application interface 330.

In the illustrated embodiment, an incoming electronic message is first received by the connection manager 322. The connection manager 322 is typically configured to work in conjunction with the e-mail handler 326 to determine the source IP address of the sender of the message. Once the source IP address of the sender has been determined, a business heuristics-based (hereinafter, simply heuristics) module in the form of a business heuristics-based source IP address module 332a assists in processing the message. The heuristics source IP module 332a may be included in the EMS as one of several software application plug-ins. More specifically, the heuristics source IP module 332a is configured to access a source IP address database 334 in order to compare the previously determined source IP address of the incoming message to those stored in the database 334. Of course, the heuristics source IP module 332a may also be configured to compare the destination IP address of an outgoing message to those stored in the database 334. Thus, as used herein, the "source IP address" includes both the IP address of a sender of the message into the EMS system, as well as the IP address of a user of the EMS system who is sending the message. Once compared, if the source IP address of the message is determined to be related to the pre-selected field or type of business (e.g., the legal industry), then an overall message filtering threshold established by the user (or perhaps the administrator of the message filtering system) may be adjusted to increase the likelihood that the message will be delivered to the intended recipient, rather than being filtered out as unwanted spam. Such a threshold adjustment is discussed in greater detail below.

Also in this embodiment, another business heuristics module, in the form of a heuristics-based content module 332b, has also been added among the multiple applications 332 associated with the EMS. As also discussed in greater detail below, the heuristics content module 332b may be comprised of software configured to analyze the content of incoming (or outgoing) electronic messages to determine the presence of content related to predetermined industries. For example, as a message is received by the EMS, the heuristics content module 332b works with the e-mail handler 326 to search/extract content within the message based on instruction code provided by the heuristics content module 332b. As with heuristics filtering based on the IP address of the message, if content related to the pre-selected business is detected, then an overall message filtering threshold established by the user (and/or the administrator) may be adjusted to increase the likelihood that the message will be delivered to the intended recipient rather than being filtered out. Thus, both the heuristics IP address module 332a and the heuristics content module 332b may be employed to determine if the message is somehow associated with a desirable business.

As used herein, being "associated with a business" means determining that any part of the message, including the source or destination IP address, the subject line, the message text, or any attachments, is in some way related to that business or to a job within that business. For example, the source or destination IP address on the message belongs to a company or other organization known to be in or related to that business, or a part of the message may include content that is typically employed by companies or other organizations known to be in or related to that business, regardless if the sender or intended recipient is actually employed or volunteers in that line of business. As such, the disclosed heuristics process may apply to messages between two persons that are not associated with a specific business or profession, but the message includes content (or an IP address) that is determined to be associated with a designated type or field of business. Another example of being "associated with an business" includes content found to be associated with professional associations of professions related to the business. For instance, a lawyer working at a financial company may still employ and benefit from legal-based heuristics filtering even though he is working at a financial company or other non-legal entity, and not strictly in the legal industry.

In one specific embodiment, the adjustment to the overall threshold may vary based on the amount of business-based content detected in the incoming message, as well as the threshold setting for the heuristics content module 332b made by either the intended recipient, the administrator, or even both. Of course, the heuristics content module 332b and the heuristics source IP module 332a are not limited to the exact embodiments and connections illustrated in FIG. 5. As such, persons who are ordinarily skilled in the pertinent field of technology/art will understand variations that may be made to those components and/or their corresponding connections to other components, without departing from the scope of the principles of filtering based on heuristics disclosed herein. Adjustments made based on either module 332a, 332b are discussed in greater detail below.

Looking now at FIG. 6, illustrated is one embodiment of a screen shot 600 for setting business-specific thresholds, in accordance with the disclosed heuristics principles. Specifically, adjustment of two business-based thresholds: "Legal" and "Financial," are illustrated. Of course, any number and/or type of business thresholds may be provided and employed with the disclosed filtering process. Also as before, once any adjustments have been made, the changes may be saved by clicking the "Save Changes" button or on the screen, or cancelled by clicking the illustrated "Cancel" button.

The business-based thresholds are provided to influence whether e-mail messages satisfy the settings of the prior base thresholds such that they are delivered to the intended recipient. More specifically, the business thresholds generally allow e-mail messages that would normally be filtered out to pass through to the intended recipient based on business heuristics. The objective of this heuristics approach to e-mail filtering is to eliminate the problem of false positives that can become an issue when using generalized spam-filtering technology. As such, the likelihood that e-mail messages will be filtered out based on the settings of the base thresholds may be reduced based on the settings of the business thresholds. Moreover, in preferred embodiments, the screen shot 600 allowing the business threshold adjustments is only available to administrators of the e-mail filtering service. In such embodiments, a user interface may be provided to intended recipients of the messages that simply allows the user to turn heuristics filtering of messages on or off. Of course, in other embodiments the intended recipients of the incoming messages are provided access to the threshold adjustment bars.

Also illustrated in FIG. 6 is the variability of the tolerance of the business thresholds. In the illustrated embodiment, as the tolerance adjustment moves from "No Extra Importance" to "Extra Importance", the likelihood that a filtered e-mail message will be allowed to pass through to the intended recipient increases. Of course, other titles for the variable range of threshold settings may also be employed. By adjusting such threshold settings, an "effective threshold" is generated based on the settings of the original base thresholds, as modified by the settings of the business thresholds. Equation (1) sets forth an example of this relationship:

$$TH_{eff} = TH_{base} \cdot TH_{ind} \qquad (1)$$

where $TH_{eff}$ is the resulting effective threshold calculated by multiplying $TH_{base}$, which is the cumulative base threshold, and $TH_{ind}$, which is the business threshold. Stated another way, as the original overall threshold is adjusted using the setting of one of the base thresholds, the result is a base threshold $TH_{base}$. Then, the business threshold $TH_{ind}$, based on its setting(s), adjusts the base threshold $TH_{base}$ to make it more lenient in certain business-based situations, thus increasing the likelihood of allowing a message through to the intended recipient that would previously have been filtered out. In some embodiments, the business threshold $TH_{ind}$ may be adjusted to an extreme setting, which would virtually be determinative of the passage of an incoming message that would otherwise have been blocked from reaching the intended recipient. Determining the effective threshold is discussed in greater detail below.

Figure 7:
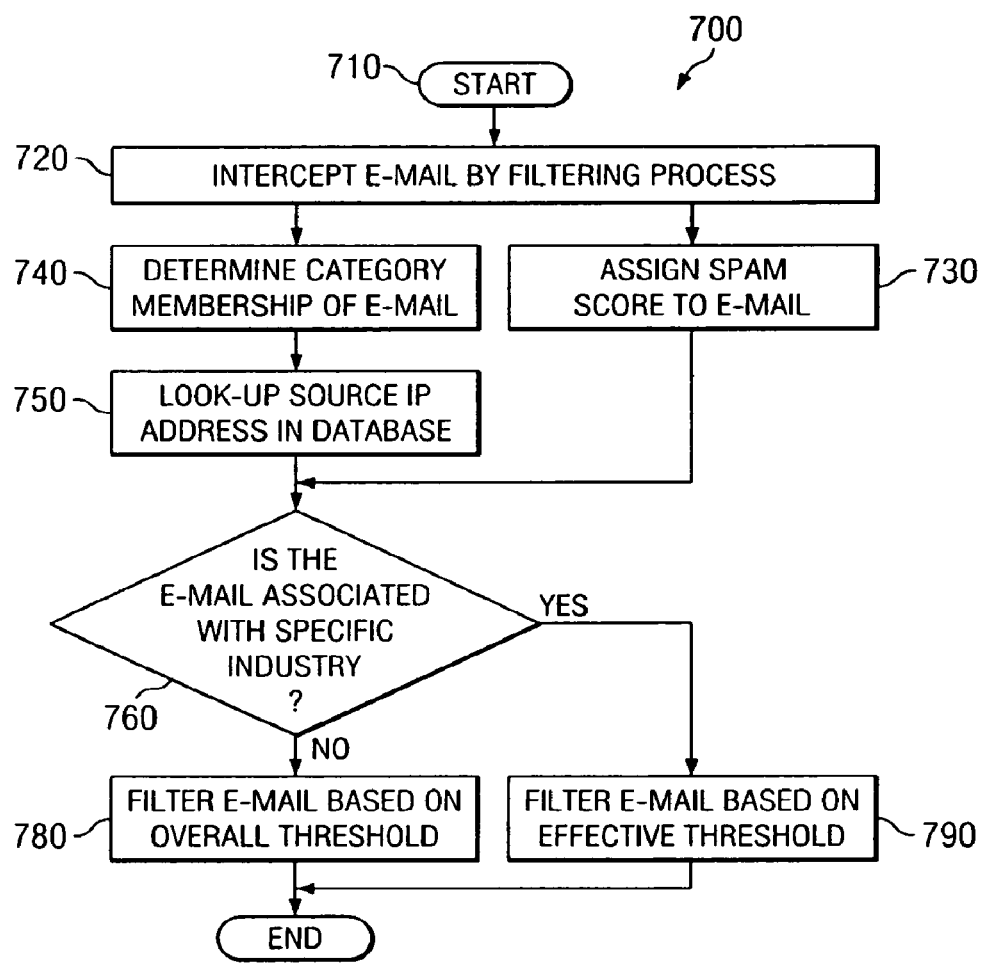
FIG. 7 illustrates a flow diagram of an exemplary process for the disclosed business heuristics-based filtering technique.

Turning now to FIG. 7, with continued reference to the screen shot 400 of FIG. 4 and the screen shot 600 of FIG. 6, illustrated is a flow diagram of an exemplary process for the disclosed business heuristics-based filtering technique. To more clearly understand the function of the disclosed approach, the exemplary process of FIG. 7 will be described with reference to a specific example. It should be understood, however, that this description should not be interpreted as a limitation to the implementation of the principles described herein, including, but not limited to, the technique for assigning values and scores to the various thresholds. The process of FIG. 7 begins at a Start block 710, wherein the disclosed e-mail filtering process is initiated.

At block 720, an incoming electronic message (i.e., an e-mail) is intercepted by the filtering process. The filtering process (e.g., typically embodied in software) may be at a geographically distinct location from the intended recipient of the e-mail, or it may be located within the recipient's on-site e-mail server. At block 730, a spam score is assigned to the incoming e-mail message, as mentioned above. The spam score given to the e-mail is typically based on several different criteria, and is used to indicate a likelihood that the message is not spam. For example, the source IP address and/or domain of the sender may be considered, as well as the domain of the destination IP addresses and the content of the subject line and/or body of the e-mail. Also, characteristics associated with the message may also be considered, such as whether the message is part of a mass mailing, whether the message is part of a directory harvest attack, whether the sender of the message is linked with prior spam mailings, etc. A detailed discussion of this part of the process is found in the co-pending patent application cross-referenced above. In this specific example, the spam score ranges from 0 or 100, where 0 indicates a certainty that the e-mail is spam, while a score of 100 indicates a certainty that the e-mail is not spam. In addition, the spam score assigned to each message passing therethrough is typically not changed throughout the filtering process, and is instead simply compared to various thresholds to determine whether the spam score falls below the threshold and should therefore be filtered from delivery to the intended recipient. Of course, other embodiments may also adjust the spam score, either alone or with an adjustment of the threshold.

On the other side of the process, at block 740, membership in a particular category associated with the base thresholds is determined. Looking back at FIG. 4, the subject line and/or body (or any associated part) of the e-mail may be scanned to look for indicators that the e-mail falls under one of the content-driven base thresholds: Sexually Explicit, Get Rich Quick, Special Offers, or Racially Insensitive. Where the assigned spam score is used to generally determine whether the e-mail will be filtered out, membership in one of the enumerated categories increases the likelihood that the e-mail will be so filtered. In a specific embodiment, each of the variable settings for these four categories may represent a multiplier used to increase the chance that the spam score will not surpass a new (adjusted) threshold, and therefore the message be filtered out. For example, if the user has an original overall threshold of 40, and an incoming e-mail includes sexually explicit material but has only been assigned a spam score of 50, without detecting membership in an offending category the e-mail will be passed through to the user since its spam score exceeds the threshold value. However, if the user's setting for a category into which the e-mail falls is high, for example, a 10 multiplier, such a setting will cause the user's original overall tolerance to be increased by the multiplier if the e-mail is determined to contain the offending content. Thus, where the spam score originally fell above the overall threshold, the same spam score for this particular e-mail is now less than the newly adjusted threshold. Therefore, the e-mail will be filtered from delivery.

In effect, the settings for the content-driven base thresholds, which create multipliers as described above, indicate a user's tolerance for false positives in filtering e-mails when the e-mails are determined to fall into the content-based (i.e., offending) categories. More specifically, in the example set forth above, the user is essentially stating that he is willing to tolerate 10 times the number of false positives (with the exemplary multiplier of 10) if the content of the e-mail is determined to contain sexually explicit material. To this end, even if the e-mail receives a very high spam score, indicating a virtual certainty that it is not spam, the e-mail may still be filtered out based on its membership in the offending category (i.e., having offending content), as influenced by a high level set by the user for each category.

Moving on to block 750, it is determined whether the source IP address of the message is associated with any of the particular industries at issue, typically by employing software plug-ins, as described above. Such a list of "approved senders" contains a list of specific source IP addresses of potential message senders so that messages from those senders are more likely to be delivered to the user's inbox based on their affiliation with an "approved" source IP address. For example, a database may be maintained that includes substantially all of the known IP addresses for all law firms in the United States. Thus, this database may be searched to determine if the source IP address for the incoming message corresponds to an address in this database. If it is determined that the source IP address is present in the database, then the user's thresholds will be adjusted on this basis, in a manner similar to that discussed above with reference to block 740. Similar embodiments are envisioned for source IP addresses found to be associated with the financial business, such as from a bank or even between a sender and recipient that are not associated with the financial business but the content of the message is still found to be associated with the financial business (e.g., through terminology or the like).

The database of source IP addresses is typically generated and kept by the administrating organization that is administering message filtering as disclosed herein, where that list is typically kept hidden from the users and competitors alike. However, filtering systems and processes as disclosed herein are broad enough to encompass embodiments where the intended recipient of the message may edit or even entirely create the list. Additionally, the thresholds for filtering while employing such a list may be variable at the adjustment of the administrator or the user. Of course, such thresholds may also be adjusted to levels where an incoming message is almost always delivered if the sender's IP address is found to be included on the database list.

Moreover, this adjustment to the user's overall threshold is typically made based on IP addresses, not on domain name as found in conventional filtering techniques. Specifically, domain name-based approaches typically include a list of "approved senders", and when the domain name for the message sender matches a domain in the list, the message is simply allowed to pass through to the intended recipient. However, such approaches are not effective against senders of unwanted messages that employ "spoofing" techniques to send messages. In such situations, the unwanted message would still include a domain name that has been "approved" for sending messages. Instead, the disclosed technique employs the source IP address (typically four multi-digit numbers separated by periods) of message senders to help determine whether the sent message should be filtered out. One embodiment of such an approach may include the matching of the source IP address with IP addresses of known valid senders stored in a database, but the disclosed technique is not so limited.

In some embodiments, more than a mere source IP address "look-up" in the database takes place. In such embodiments, other factors may be taken into account, such as the comparison of the sending IP address with that of the intended recipient to determine if both are members of the same business. If it is so determined, than the likelihood that the message is spam is less, and so the recipient's overall threshold may be adjusted (e.g., lowered) to reflect this likelihood. In these and other embodiments, various comparisons may be made with the source IP address using such business-based viewpoints to determine whether the user's overall threshold should be adjusted to increase the likelihood that the message will be allowed to pass through. For example, other determinations may include viewing past message traffic or connection attempts by the sending IP address (with or without consideration of any destination IP addresses) to determine if there is a pattern in such traffic/attempts that is typically associated with senders of spam rather than valid message senders. Other examples include comparing prior message traffic between the source IP address and other intended recipients within the business, or where the source IP address is assigned as related to a particular business through an external verification processes. Of course, a system and process as disclosed herein may include any such approaches, while remaining within the scope of the present disclosure and any claims issuing therefrom.

Next, at block 760, it is determined whether content in the e-mail message is associated with specific predetermined industries. More specifically, this determination is made considering the threshold adjustment based on whether there is business content in the e-mail that corresponds to one of the pre-selected industries. Plug-in applications (see FIG. 3) may also be used to analyze the content of the e-mail looking for key terms or phrases that are typically associated with the industries. For example, if several instances of "legalese" are detected in the content of the e-mail and it is determined that the e-mail is sufficiently associated with the legal business, the user's threshold may be adjusted for comparison with the message's assigned spam score to accomplish the disclosed filtering process. As a result, if sufficient business content is detected in the message, the multiplier associated with the specific threshold may be set low enough such that the message is delivered to the intended recipient, even if the message would have been filtered out based on its spam score (or for other reasons) had no business content been found. As with the source IP addresses, a database may be used to store key terms and phrases associated with the business to accomplish the business content determination, and the disclosed technique is not limited to industries in which the intended recipient works. Moreover, a process conducted in accordance with the principles disclosed herein may include blocks 750 and 760 in any order, or may even be conducted simultaneously, without departing from the scope of this disclosure.

If no business association is found in the e-mail content, then the process moves on to block 780. At this block, filtering of the e-mail is conducted based on a comparison of its assigned spam score to the current overall threshold value. If at block 740 it was determined that the content of the e-mail did not warrant membership in any of the offending categories, then the filtering is done using the original overall threshold. To this end, if the spam score does not exceed the original threshold, then delivery of the e-mail to the intended recipient is blocked. However, if membership in one of the offending categories was determined, then the filtering is based on a comparison between the assigned spam score and the adjusted overall thresholds. Specifically, as mentioned above, category membership may result in the overall threshold value being increased (depending on the setting established by the user or system administrator), so as to decrease the likelihood that the e-mail will be allowed to the reach the user. Thus, if the spam score does not exceed the adjusted overall threshold value, then delivery of the e-mail to the intended recipient is blocked. Conversely, in either case, if the spam score should exceed either the original or adjusted overall thresholds, then the e-mail will be delivered to the user.

If it was determined at block 760 that there is an association with any of the selected industries, whether based on the business-related source IP address (block 750) and/or the business-based content determination, the process instead moves to block 790. At this block, the e-mail is filtered based on a comparison of its assigned spam score to the effective threshold value, as adjusted in accordance with blocks 750 and 760. The effective threshold is determined as described above, where the overall threshold is typically decreased depending on the settings established by the user and/or the system administrator. Like the base threshold values, the business threshold values include multipliers of the original overall threshold. However, where the base threshold values were multipliers greater than 1 (in order to increase the overall threshold and increase the chance of filtering out the message in this embodiment), the multipliers for the business threshold values may all be less than 1. Thus, in such embodiments, multiplying the overall threshold value with such a fractional multiplier decreases that overall threshold value, which increases the chance that the message will be allowed through the filtering process and be delivered to the intended recipient.

The increase in the likelihood of passing through is true regardless of whether the original overall threshold or an adjusted overall threshold is used. This advantage of the disclosed approach is particularly beneficial when an e-mail has been categorized into one of the offending categories, but yet is actually an important and desired e-mail for the intended recipient to have. In a specific example, an e-mail that is determined to include a number of racial slurs therein will likely be categorized under the "Racially Insensitive" base threshold. Moreover, since the recipient has set this base threshold at the maximum, in this example, there is even a less likely chance that the e-mail will reach the intended recipient.

However, if the e-mail actually includes legal documents pertaining to a suit based on the use of those racial slurs, then the e-mail would be filtered out improperly. To prevent such a false positive, the disclosed approach allows the threshold to be adjusted based on the content of the e-mail (or perhaps the source IP address), if associated with, for example, the legal industry. In essence, the use of the business threshold multipliers allows a user to essentially state that less false positives will be tolerated if an association to the selected industries in the business thresholds is determine to exist. Thus, if the e-mail did contain such legal content, then the overall threshold will typically be decreased in this embodiment by the multiplier corresponding to the setting established in the "Legal" business threshold. As a result, the likelihood that the e-mail will be allowed to reach the recipient is therefore increased. Additionally, the amount of the multiplier (and thus the amount of adjustment to the overall threshold) may be established, in one embodiment, by the intended recipient by an adjustment in the settings for separate thresholds for each business.

A similar result may be attained if the source IP address or domain is found to be associated with the legal industry. For example, assuming that the domain used by a prestigious law firm has been identified in the source (or destination) IP address contained in the e-mail. In this example, while the e-mail may contain racial slurs therein, the likelihood that a prestigious law firm (whose source domain has been identified in the e-mail and matched to a database of approved senders) is sending out (or being sent) racially insensitive e-mail as spam is very remote. Unfortunately, however, the classification of the e-mail as "Racially Insensitive" based on its content will greatly decrease the chance for the e-mail to pass through the filtering process. By employing the disclosed technique, however, the overall threshold, although adjusted due to category membership, may then be decreased based on determined business association to create a more lenient effective threshold, and thus increase the chance that this particular e-mail will reach the intended recipient. Of course, in some embodiments, the process may simply be configured to definitively deliver the incoming message to the intended recipient if the source IP address of the message has been determined to be associated with one of the predetermined industries, although approval is based on association with a predetermined business, in accordance with the disclosed principles.

While various embodiments of systems and methods for filtering electronic messages according to the business heuristics-based principles disclosed herein have been disclosed, it should be understood that they have been presented by way of example only, and not limitation. Thus, the breadth and scope of the invention(s) should not be limited by any of the above-described exemplary embodiments, but should be defined only in accordance with the following claims and their equivalents. Moreover, the above advantages and features are effected in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A system for filtering an electronic message using business heuristics, the system comprising:
    a message management server installed on one or more computing devices and connected to a communications network for receiving the electronic message;
    a message handler installed on the server and configured to examine the electronic message for characteristics indicative of its desirability or undesirability to an intended recipient of the electronic message, and to establish a likelihood that delivery of the electronic message to the intended recipient should be blocked; and
    a heuristics module associated with the message handler and configured to determine whether the electronic message is associated with a desirable business, the message handler further configured to automatically decrease the likelihood that delivery of the electronic message to the intended recipient should be blocked if the electronic message is determined to be associated with the desirable business.

2. A system according to claim 1, further comprising a software module associated with the message handler and configured to assign a spam-score to the electronic message based on the examination and representing the likelihood that delivery of the electronic message should be blocked, the message handler further configured to adjust the spam-score when decreasing the likelihood that delivery of the electronic message should be blocked, the message handler delivering or blocking delivery of the electronic message based on a comparison of the adjusted spam-score to an overall threshold.

3. A system according to claim 2, wherein the message handler is further configured to deliver or block delivery of the electronic message to the intended recipient when the adjusted spam-score does not exceed the overall threshold.

4. A system according to claim 1, further comprising a software module associated with the message handler and configured to assign a spam-score to the electronic message based on the examination and representing the likelihood that delivery of the electronic message should be blocked, the message handler further configured to adjust an overall threshold when decreasing the likelihood that delivery of the electronic message should be blocked, the message handler delivering or blocking delivery of the electronic message based on a comparison of the spam-score to the overall threshold.

5. A system according to claim 1, wherein the heuristics module is configured to determine whether the source of the electronic message is associated with the desirable business, the message handler configured to adjust the likelihood of that delivery of the electronic message to the intended recipient should be blocked if the source of the electronic message is determined to be associated with the desirable business.

6. A system according to claim 5, wherein the message handler is further configured to decrease the overall threshold to accomplish delivery of the electronic message if the source of the electronic message is determined to be associated with the desirable business.

7. A system according to claim 5, wherein the source comprises an Internet Protocol (IP) address of a sending server of the electronic message.

8. A system according to claim 7, wherein the heuristics module is further configured to determine whether the source is related to the desirable business by comparing one or more of the IP address of the source to at least one of an IP address of the intended recipient, comparing prior connection attempts by the source IP address to the intended recipient, comparing prior message traffic between the source IP address and the intended recipient, comparing prior message traffic between the source IP address and other intended recipients within the business, or determining if the source IP address is assigned to be related to a particular business through external verification processes.

9. A system according to claim 1, wherein the heuristics module is further configured to determine the presence of business content in the electronic message likely to be used by the desirable business, the message handler further configured to decrease the likelihood that delivery of the electronic message to the intended recipient should be blocked if the business content is determined to be present in the electronic message.

10. A system according to claim 9, further comprising a software module associated with the message handler and configured to assign a spam-score to the electronic message based on the examination and representing the likelihood that delivery of the electronic message should be blocked, wherein the heuristics module is further configured to create an effective threshold by adjusting an overall threshold based on the presence of the business content, and the message handler is further configured to block delivery of the electronic message to the intended recipient if the spam-score does not cross the effective threshold.

11. A system according to claim 9, wherein the heuristics module comprises a business threshold to govern the determining of the presence of business content.

12. A system according to claim 11, wherein the heuristics module is further configured to create an effective threshold by adjusting an overall threshold by an amount proportional to an amount of the business threshold.

13. A system according to claim 11, wherein the amount of the business threshold is established by an administrator of the system.

14. A system according to claim 10, the system further comprising a second software module configured to determine the presence of offending content in the electronic message corresponding to at least one base threshold, and further configured to adjust the overall threshold prior to the heuristics module creating the effective threshold based on the presence of the offending content.

15. A system according to claim 14, wherein the amount of the at least one base threshold is established by the intended recipient of the electronic message.

16. A system according to claim 14, wherein the at least one base threshold is a content-based tolerance of electronic messages associated with categories selected from the group consisting of sexually explicit content, get-rich-quick content, special-offers content, and racially insensitive content.

17. A system according to claim 14, wherein the second software module is further configured to adjust the overall threshold by an amount proportional to an amount of the at least one base threshold.

18. A system according to claim 10, wherein the overall threshold is established by the intended recipient of the electronic message.

19. A system according to claim 1, wherein the desirable business is selected from the group consisting of the legal profession and financial professions.

20. A system according to claim 1, wherein the intended recipient is associated with the desirable business.

* * * * *